United States Patent [19]

Beasley, Jr. et al.

[11] Patent Number: 5,795,428
[45] Date of Patent: *Aug. 18, 1998

[54] METHOD FOR MIDSPAN ENTRY OF OPTICAL RIBBON FIBER

[75] Inventors: William E. Beasley, Jr., Durham, N.C.; John P. Sarbell, Grand Island, Fla.; James W. Moran, Marlton, N.J.

[73] Assignee: Sumitomo Electric Lightwave Corp., Durham, N.C.

[*] Notice: The term of this patent shall not extend beyond the expiration date of Pat. No. 5,460,683.

[21] Appl. No.: 795,467

[22] Filed: Feb. 4, 1997

Related U.S. Application Data

[63] Continuation of Ser. No. 333,420, Nov. 2, 1994, Pat. No. 5,600,750, which is a continuation-in-part of Ser. No. 292,859, Aug. 19, 1994, Pat. No. 5,460,683.

[51] Int. Cl.⁶ .................................................. B32B 35/00
[52] U.S. Cl. ........................................ 156/344; 156/584
[58] Field of Search ...................... 156/344, 584; 81/9.4; 29/564.4

[56] References Cited

U.S. PATENT DOCUMENTS 4,046,298  9/1977  Schroeder, Jr. ................ 156/344 X
5,460,683  10/1995  Beasley, Jr. et al. ............ 156/344
5,643,393  7/1997  Genovese et al. ............... 156/344

Primary Examiner—Mark A. Osele
Attorney, Agent, or Firm—Jenkins & Wilson, P.A.

[57] ABSTRACT

A method of removing the encapsulant matrix from a selected span of optical ribbon fiber to provide access to one or more selected optical fibers wherein a strip of adhesive tape having a plastic card element attached to one end thereof is placed on a support surface with an adhesive surface of the strip of tape facing upwardly. A selected span of optical ribbon fiber is placed across the exposed top surface of the strip of tape and across the plastic card element. A selected amount of glue is positioned beneath the span length of the optical ribbon fiber overlaying the plastic card element so as to bond the optical ribbon fiber to a portion thereof. Next, the end of the optical ribbon fiber overlaying the plastic card element is lifted so as to initiate delamination of the encapsulant matrix from the optical fibers of the optical ribbon fiber, and the delamination caused by the tension on the glue bond is propagated by lifting the span length of the optical fiber which overlays the exposed surface of the strip of tape. Thus, the optical fibers contained within the optical ribbon fiber are removed from the encapsulant matrix by applying the delamination procedure to one or both sides of the optical ribbon fiber as may be required.

3 Claims, 8 Drawing Sheets

METHOD FOR MIDSPAN ENTRY OF OPTICAL RIBBON FIBER

RELATED APPLICATIONS

This application is a continuation application of application Ser. No. 08/333,420 filed Nov. 2, 1994, and issued on Feb. 4, 1997 as U.S. Pat. No. 5,600,750, that is a continuation-in-part application of application Ser. No. 08/292,859 filed Aug. 19, 1994 and issued on Oct. 24, 1995 as U.S. Pat. No. 5,460,683.

FIELD OF THE INVENTION

The present invention relates to optical ribbon fiber, and more particularly to an improved method for midspan entry of an optical ribbon fiber to access one or more selected optical fibers from the plurality of optical fibers carried within the optical ribbon fiber.

DESCRIPTION OF THE RELATED ART

Optical ribbon fiber is an optical fiber cable that has become quite popular for many uses. Unlike conventional loose tube optical cables wherein the 250 micrometer (μm) color-coded optical fibers are placed loosely inside a gel-filled plastic tube, ribbon cables contain a plurality of optical ribbon fibers. Optical ribbon fibers normally incorporate multiple 250 μm color-coded optical fibers (typically 2–18 fibers) which are held together in the form of a flat linear matrix by a suitable ultraviolet (UV) curable encapsulant material. Although different materials can be utilized for the encapsulant matrix, the matrix is most suitably formed from acrylate resins which are well known to one skilled in the fiber optic art.

The tight packing density of the optical ribbon fiber advantageously provides for high fiber count in a relatively small diameter ribbon cable. However, a short-coming of the optical ribbon fiber used in ribbon cables is the difficulty of midspan access to selected fibers in the optical ribbon fiber. For example, in order to enter a pre-installed ribbon cable at an intermediate position along its length to access one or more selected optical fibers therein without cutting or damaging the surrounding optical fibers is a problem for the fiber optic industry.

By way of further background, applicants note that optical ribbon fiber is an ideal construction for easy fiber identification and for mass splicing techniques in the field. For long haul applications, cable end-to-end splicing is typically performed wherein the end of the cable is exposed and all of the fibers within an optical ribbon fiber are typically spliced at one time. With the new deployment of ribbon cable within distribution and local loops, more sheath entries are now being made along the length of ribbon cable. Since normally only several individual optical fibers are needed at the breakout point, cutting the entire ribbon cable is not efficient in terms of splicing and is often not possible due to the presence of live fibers within the cable. This problem renders end-to-end ribbon cable splicing undesirable and has led to the development of the prior art midspan sheath entry methodology.

Midspan cable entry techniques have been developed for entering the cable sheath without cutting the optical fibers. If all of the fibers within a single optical ribbon fiber are to be spliced, then breaking an individual optical ribbon fiber is relatively easy. However, if only several fibers within an optical ribbon fiber are to be accessed, then it is necessary to separate them from the remaining fibers in the optical ribbon fiber, and a good method for accessing single optical fibers or groups of optical fibers within an optical ribbon fiber has yet to be developed despite the long-felt need for such a technique.

The fiber optic industry has set forth certain industry requirements for an acceptable optical ribbon fiber midspan entry procedure and they include the following:

1. Full flexibility in terms of length and number of fibers accessed within the optical ribbon fiber structure;
2. Access of the one or more selected optical fibers must be performed without cutting any of the optical fibers in the optical ribbon fiber structure;
3. The midspan access procedure must not impart damage to optical fibers or optical fiber coatings (which could result in a degradation of an optical fiber's longevity and/or reliability);
4. The midspan access procedure cannot impart damage to any individual optical fiber's color coating (which must serve to distinguish individual fibers from each other);
5. The midspan access procedure cannot cause significant attenuation increase in any live optical fibers contained within the optical ribbon fiber during the procedure;
6. The midspan access procedure must be a fast method in order to reduce field costs to a minimum; and
7. The midspan access procedure must be capable of being used under adverse working and inclement weather conditions.

In view of the importance of a viable midspan access procedure for optical ribbon fiber, many efforts have been made by those skilled in the fiber optic art to develop a suitable technique. For example, efforts have been made to gain midspan entry by soaking optical ribbon fiber in a solvent gel and then wiping off the solvent matrix material with a rough pad or the like. However, this procedure has proven to be messy, time consuming, unreliable, limited to a relatively short region of midspan entry, and does not act to retain optical fiber color coatings. Thus, this procedure has numerous shortcomings and is not commercially acceptable.

Other techniques for midspan entry of a ribbon fiber include splitting an optical ribbon fiber of interest into multiple ribbons. However, this procedure has not proven satisfactory in use since it does not remove the matrix encapsulant material from the entire optical ribbon fiber and thus limits flexibility with respect to which optical fibers can be accessed. Also, efforts have been made to gain midspan access to selected fibers within an optical ribbon fiber by utilizing a blade to shave selected matrix encapsulant material from the area of interest. However, this technique has proven too unreliable in use and thus unsatisfactory for commercial application.

Also, applicants' assignee also owns a midspan entry technique which is the subject matter of a U.S. patent application filed on Jun. 16, 1994 as Ser. No. 08/260,713. The technique disclosed and claimed in the application is directed to a process whereby delamination of the bond between the optical fibers and the matrix encapsulant of an optical ribbon fiber is accomplished by friction abrading of the optical ribbon fiber. The teachings of the patent application are incorporated herein by reference since it is generally directed to solving the same problem as the present invention. Although this prior delamination technique as disclosed in the aforementioned pending U.S. patent application has a higher degree of efficacy than previously known efforts, applicants believe that the novel process of the present invention is even more advantageous in providing a solution to the long-felt need for a commercially applicable midspan entry procedure for optical ribbon fiber.

DISCLOSURE OF THE INVENTION

In accordance with the teachings of the present invention, the problem of simple and reliable midspan accessing of one or more selected optical fibers carried within an optical ribbon fiber in an optical cable has now been overcome. The improved method for midspan entry of an optical ribbon fiber contemplates removing the encapsulant matrix from a selected span of the optical ribbon fiber to provide access to one or more selected optical fibers.

The improved procedure for midspan entry of an optical ribbon fiber includes placing a plastic card on a suitable support surface and then securing one end of a strip of adhesive tape to the card so that the exposed top surface of the strip of tape has adhesive thereon. Next, the selected span of optical ribbon fiber is placed on the exposed top surface of the strip of tape and across the plastic card so that the optical ribbon fiber is adhered to the strip of tape. The span length of the optical ribbon fiber overlaying the card is lifted, a selected amount of glue is placed on the card beneath at least a portion of the lifted span length, and the lifted span length is then laid down onto the glue and the card after the glue has dried, the span length of the optical ribbon fiber which overlays the card is lifted so as to initiate delamination of the encapsulant matrix from the optical fibers of the optical ribbon fiber, and the delamination is propagated along a portion of the remaining selected span length of the optical ribbon fiber by lifting the span length of the optical ribbon fiber which overlays the strip of tape.

It is therefore the object of the present invention to provide an improved midspan access procedure for optical ribbon fiber.

It is another object of the present invention to provide an improved midspan access procedure for optical ribbon fiber which allows entering the cable sheath without cutting or otherwise damaging any optical fibers carried thereby.

It is still another object of the present invention to provide an improved midspan access procedure for optical ribbon fiber which is easy to accomplish and can be used under a variety of situations.

It is still another object of the present invention to provide an improved midspan access procedure for optical ribbon fiber which reduces costs associated with use of the procedure in the field and which has a high probability of success.

It is yet another object of the present invention to provide an improved midspan access procedure for optical ribbon fiber which is relatively quick to accomplish and can be performed on a live ribbon fiber in the field with little attenuation increase.

Some of the objects of the invention having been stated, other objects will become evident as the description proceeds, when taken in connection with the accompanying drawings, which are described hereinbelow.

BEST MODE FOR CARRYING OUT THE INVENTION

Referring now more specifically to FIGS. 1–8, applicants will describe the novel procedure of the subject invention in detail for the complete understanding of one skilled in the fiber optic art.

Figure 1:
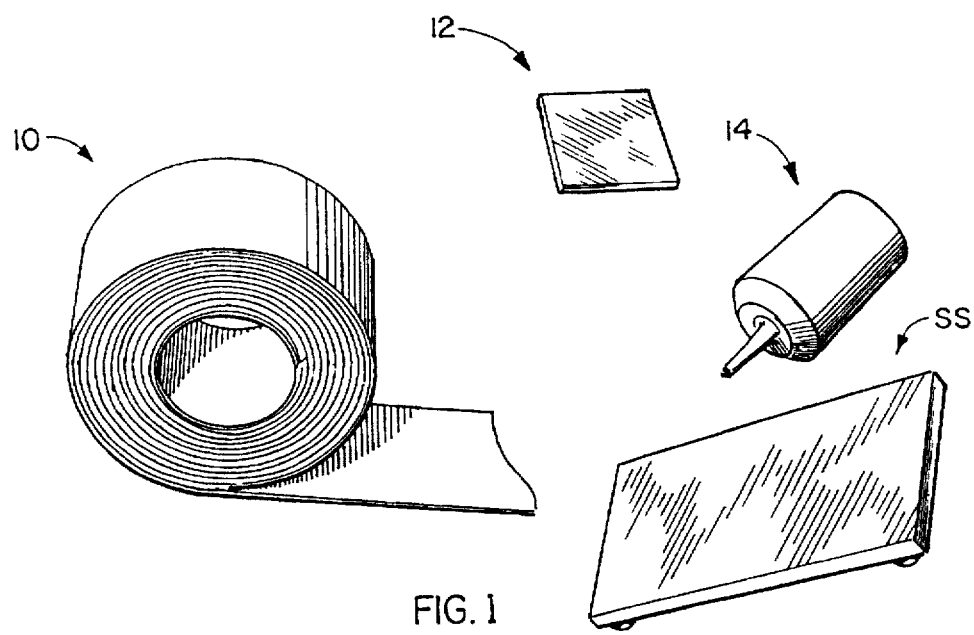
FIG. 1 is a perspective view of the tools used in a preferred embodiment of the present invention.

Applicants' subject invention is practiced with tools such as shown in FIG. 1 and which will now be described. It should also be appreciated that the method of the invention is intended to be practiced on optical ribbon fiber of the type consisting of typically from 2–18 optical fibers which are bonded together in the form of a flat, linear matrix. The optical fibers are most suitably bonded together with an encapsulant matrix comprising a UV cured acrylate material.

As seen in FIG. 1, the tools required to practice the inventive method include a single or double sided rolled or pre-cut packaging tape 10, a thin, semi-flexible plastic card 12, and a cyanoacrylate based adhesive glue 14. Adhesive tape 10 most suitably is a single side or double side packaging tape such as carpet tape manufactured by 3M Corporation. A suitable adhesive glue is KRAZY GLUE® brand glue distributed by Borden Inc. Plastic card 12 should be formed from a material having a similar glue absorption rate as the UV cured acrylate encapsulant matrix of optical ribbon fiber since proper adhesion would not be achieved if either the optical ribbon fiber or the plastic card were to absorb glue 14 at a faster rate than the other. Thus, plastic card 12 most suitably is relatively thin to prevent sharp bends of optical ribbon fiber to be positioned thereon, and is formed from cellulose acetate, LEXAN® or other plastic materials compatible with glue 14. Glue 14 is most suitably a cyanoacrylate based adhesive which possesses quick drying and easy application characteristics and which is evenly absorbed into both the optical ribbon fiber and card 12.

The method of the invention described below has been determined to require about 1 to 2 minutes to practice, and although the detailed description primarily addresses removing encapsulant matrix from a midspan portion of optical ribbon fiber, the process is also intended for use to access individual fibers of optical ribbon fiber by end entry as well as midspan entry. In other words, the procedure of the invention can be practiced for either midspan or end entry of optical ribbon fiber although the detailed description of the invention provided herein is directed primarily to the midspan entry application of the invention.

Figure 2:
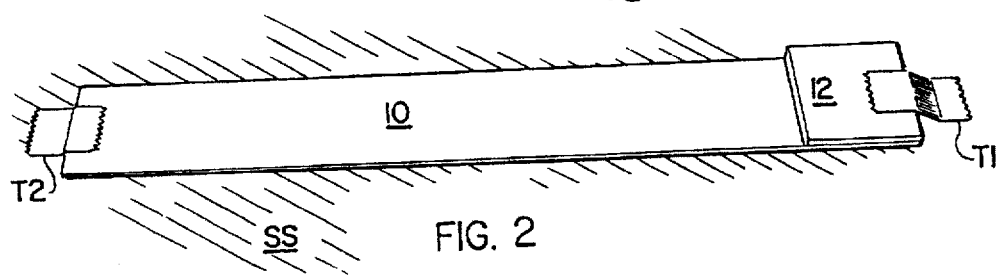
FIG. 2 is a perspective view of the card element and strip of adhesive tape secured to a support surface.

Referring now to FIG. 2, a length of single side adhesive packaging tape 10 has been attached at one end to plastic card 12 with the adhesive side of tape 10 facing upwardly. Tape 10 and attached plastic card 12 have been secured to a suitable support surface SS (such as a rigid portable plastic base plate or a stationary table top or the like) and taped at each end to support surface with additional pieces of tape T1 and T2. If a double side adhesive tape 10 is utilized, applicants contemplate that one side of strip of tape 10 would be adhered to support surface and the protective paper coating then peeled from the other side so as to allow securement of plastic card 12 to one end thereof.

Figure 3:
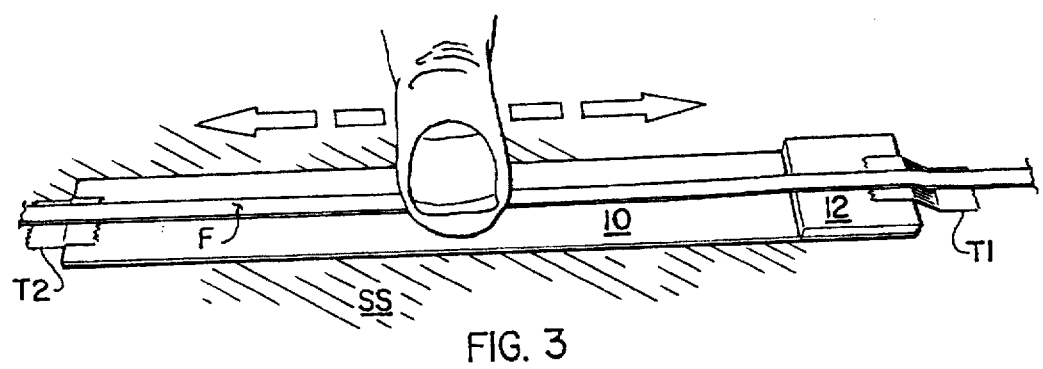
FIG. 3 is a perspective view of an optical ribbon fiber being placed on the card element and strip of tape, and adhered to the strip of tape.
Figure 4:
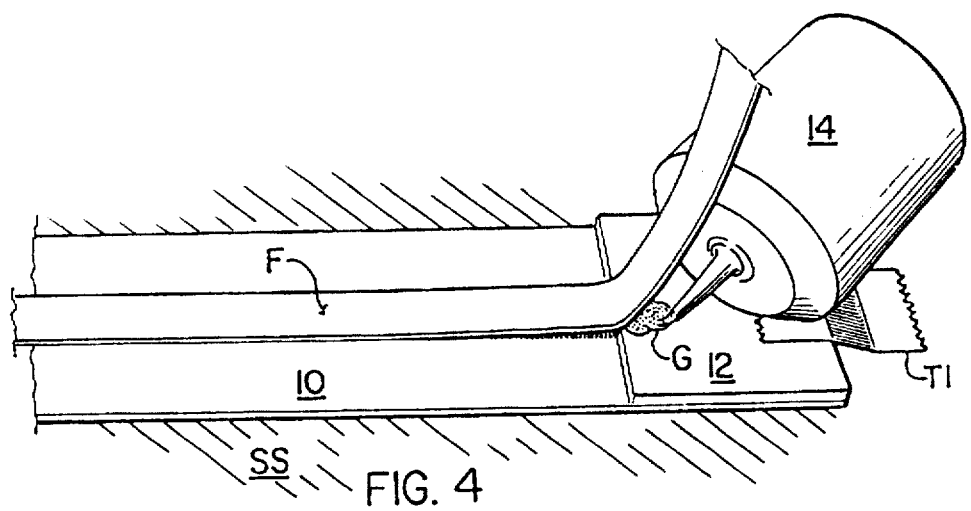
FIG. 4 is a perspective view illustrating the optical ribbon fiber overlaying the card element being lifted and a drop of cyanoacrylate based adhesive glue being placed beneath the optical ribbon fiber and on the edge of the card element.
Figure 5:
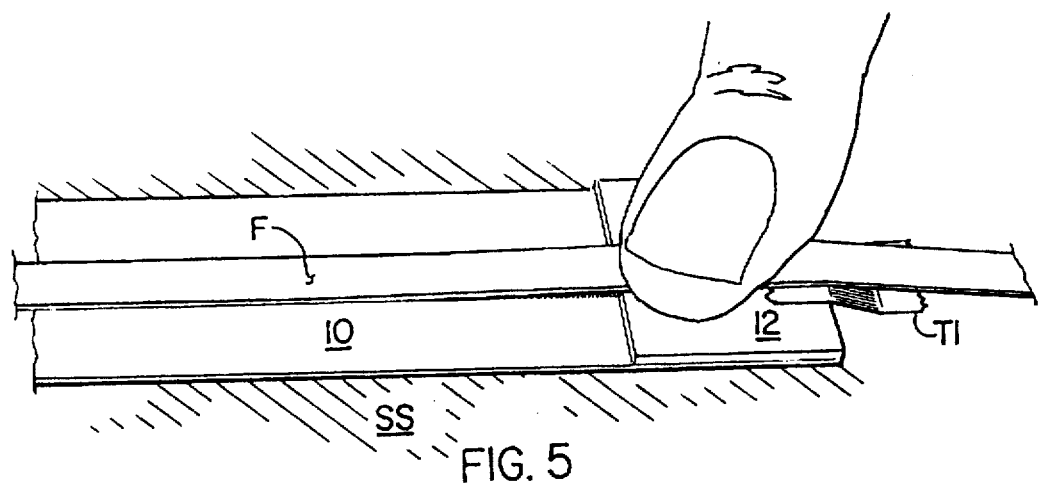
FIG. 5 is a perspective view showing the optical ribbon fiber being laid back across the strip of tape and card element and being pressed against the card element so that the glue will cause the optical ribbon fiber to bond to the card element.

As best shown in FIGS. 3–5, a midspan portion of optical ribbon fiber F which is to be accessed is placed down along the length of strip of tape 10 and across the face of plastic card 12 (see FIG. 3). A finger is then run down the length of optical ribbon fiber F to ensure adhesion thereof to strip of tape 10. Next, as best seen in FIG. 4, the end of optical ribbon fiber F overlaying plastic card 12 is lifted and a medium size drop G of cyanoacrylate based adhesive glue 14 is placed on the edge of plastic card 12 adjacent strip of adhesive tape 10. Glue drop G is most suitably about ⅛ inch in diameter. After glue drop G has been applied to the surface of plastic card 12, optical ribbon fiber F is then laid back across plastic card 12 so that glue drop G is positioned between optical ribbon fiber F and plastic card 12. Most suitably, a finger is once again run along the length of optical ribbon fiber F overlaying plastic card 12 (see FIG. 5) to properly spread out the glue, and the glue is allowed to dry (most suitably for at least 15 seconds). Thus, optical ribbon fiber F is now adhered to the adhesive surface of strip of tape 10 as well as strongly bonded to a portion of plastic card 12.

Figure 6:
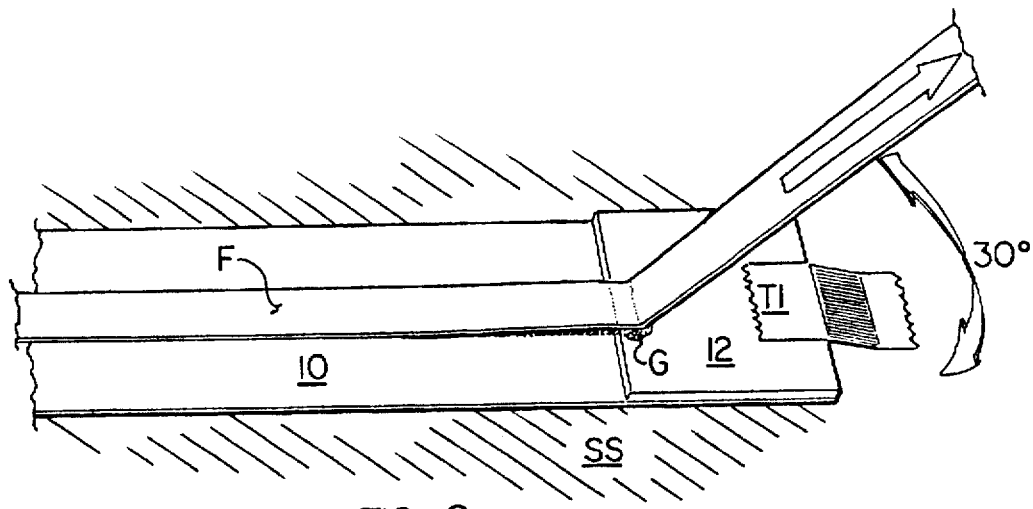
FIG. 6 is a perspective view showing the portion of the optical ribbon fiber overlaying the card element being lifted so as to initiate delaminate of the encapsulant matrix from the optical fibers of the optical ribbon fiber at the spot where the optical ribbon fiber is glued (bonded) to the card element.
Figure 7:
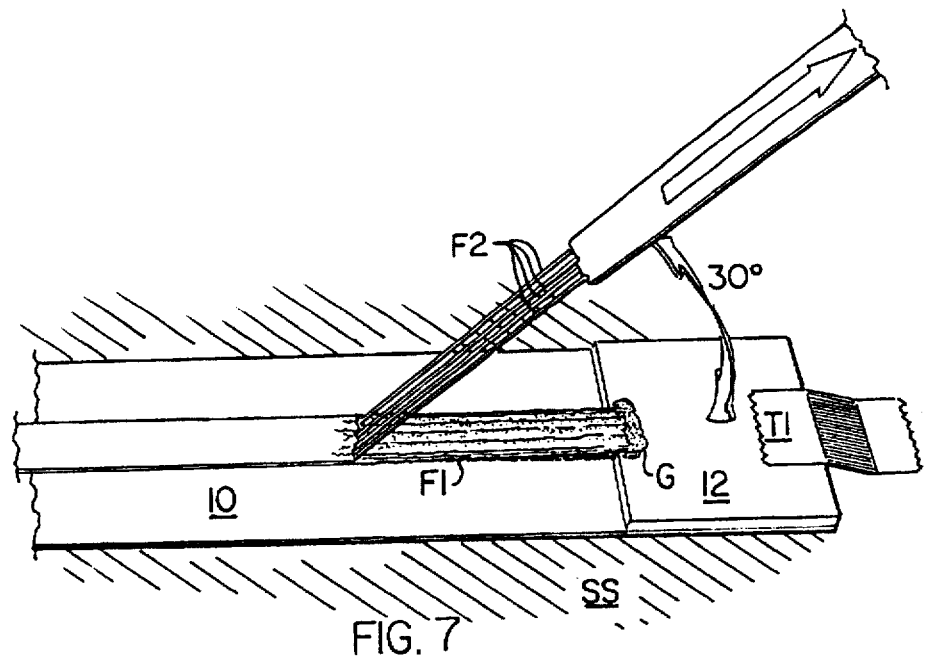
FIG. 7 is a perspective view showing the optical ribbon fiber being further lifted from the strip of tape so as to propagate the delamination of the encapsulant matrix from the optical fibers along the length of the strip of tape.
Figure 8A:
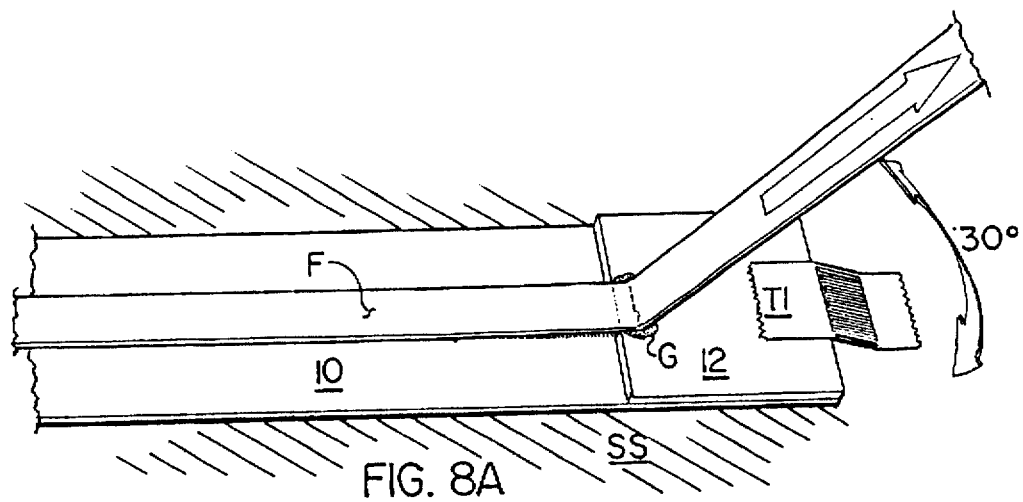
FIGS. 8A–8D are perspective views of an alternative embodiment of the present invention wherein first one side of the optical ribbon fiber is glued to the card element so as to initiate delamination and propagate the delamination (FIGS. 8A and 8B, respectively) on one side of the optical ribbon fiber; and the optical ribbon fiber is then turned over and again glued to the card element so as to again initiate delamination and propagate the delamination (FIGS. 8C and 8D, respectively) along the length of the strip of tape.
Figure 8B:
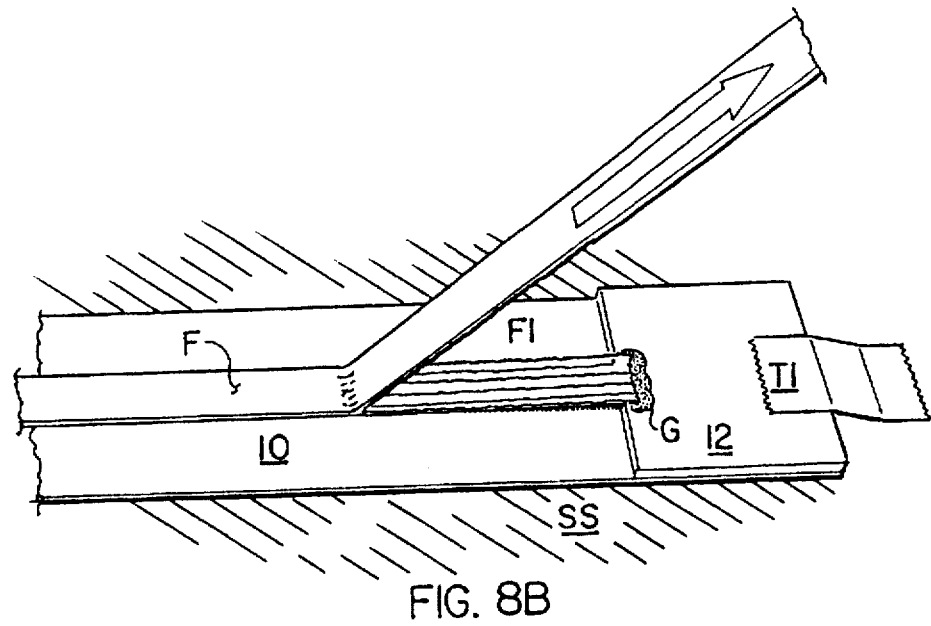
Figure 8C:
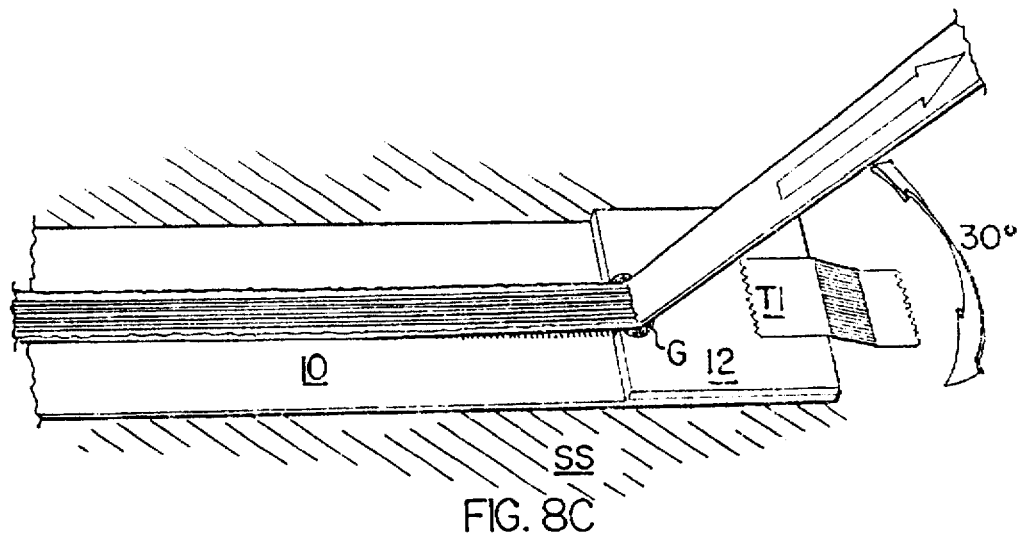
Figure 8D:
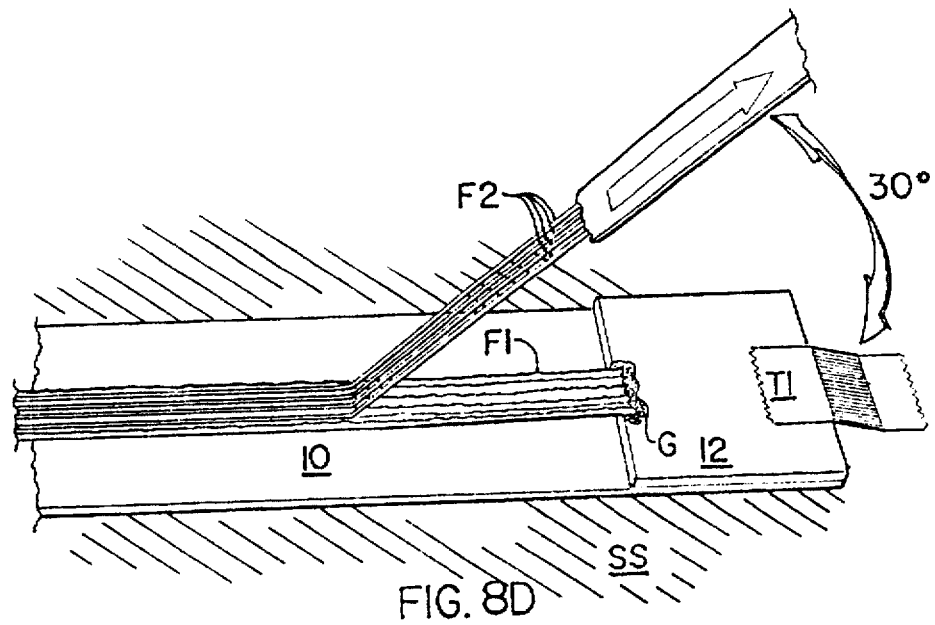

Referring now to FIGS. 6 and 7, applicants contemplate that the delamination of the optical fibers from the encapsulant matrix of optical ribbon fiber F is initiated by carefully lifting the end of fiber F overlaying plastic card 12 and applying tension thereto until the encapsulant matrix F1 delaminates from the optical fibers F2 of optical ribbon fiber F at the point where fiber F is bonded to plastic card 12 (see FIG. 6). Once the delamination of optical fibers F2 from encapsulant matrix F1 has been initiated at the glue bonded spot on plastic card 12, the delamination is propagated (see FIG. 7) by slowly continuing to lift optical ribbon fiber F away from strip of tape 10 along the length thereof so as to leave encapsulant matrix F1 adhered to plastic card 12 and strip of tape 10 and thereby free uplifted optical fibers F2. Applicants have discovered that for accessing optical ribbon fiber F it is preferably (but not necessary) to maintain a shallow pull angle of 30° or less during the delamination portion of the method of the invention. Also, a pen or pencil (not shown) or other similar object may be positioned under optical ribbon fiber F to facilitate breaking of the glue bond to reduce any significant attenuation increase when dealing with a live optical ribbon fiber F.

FIGS. 1–7 have shown a preferred embodiment of applicants' invention wherein it is possible to remove both sides of the encapsulant matrix from optical ribbon fiber P with one delamination action. However, in an alternative embodiment shown in FIGS. 8A–8D, it is contemplated that the optical ribbon fiber F will first have the delamination procedure described in FIGS. 1–7 performed on one side thereof and then optical ribbon fiber F will be flipped over and the delamination procedure repeated on the other side thereof (see FIGS. 8C and 8D) to remove the encapsulant matrix from the other side of optical ribbon fiber F. Whether the method of the present invention is performed on one side or both sides of an optical ribbon fiber is a function of the size and construction of optical ribbon fiber F to which access is desired. However, the novel method of the invention is contemplated to encompass both one side and two side midspan entry of optical ribbon fiber F.

Figure 9:
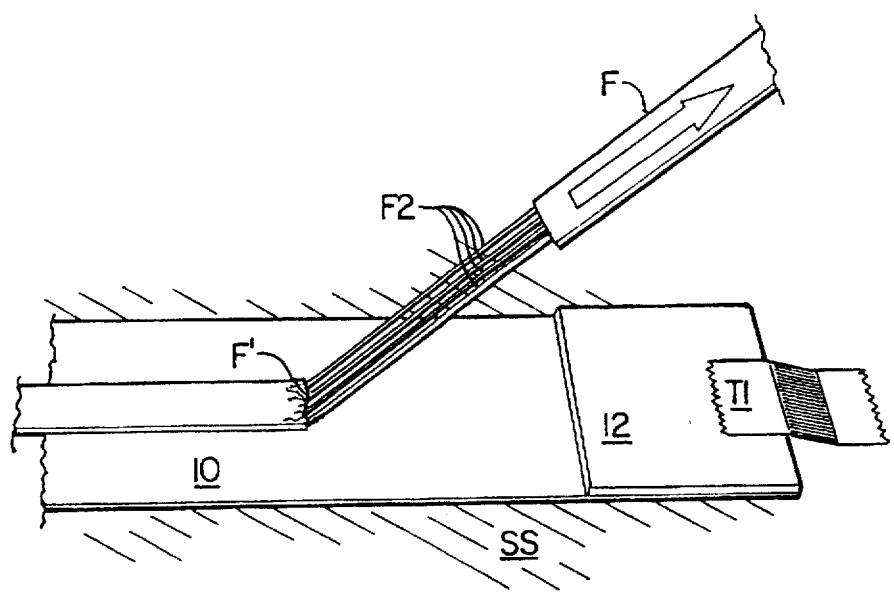
FIG. 9 is a perspective view showing how to access additional lengths of optical ribbon fiber without glue by replacing the previously delaminated optical ribbon fiber on a clean strip of tape and lifting it from the strip of tape (and repeating the procedure on the opposite side of the optical ribbon fiber, if necessary)

Also, as best seen in FIG. 9, applicants contemplate that in order to access additional (longer) lengths of optical ribbon fiber subsequent to the procedure described above, one need simply to replace the optical ribbon fiber on a clean strip of tape and then lift the optical ribbon fiber away therefrom. The optical ribbon fiber is not required to be glued to the card element to initiate the additional delamination (or peeling) so long as the free end F of the optical ribbon fiber is placed on the clean strip of tape. This additional peeling of the encapsulant matrix from the optical fibers can be performed on either one side or both sides of the optical ribbon fiber, as may be required.

Finally, applicants desire to again note that the process of the invention while described in detail for midspan entry of an optical ribbon fiber can also be practiced for end entry of an optical ribbon fiber, and the invention is contemplated to encompass both types of fiber access.

Preferred Optical Ribbon Fiber Properties For Use With Midspan Entry Method

Figure 10:
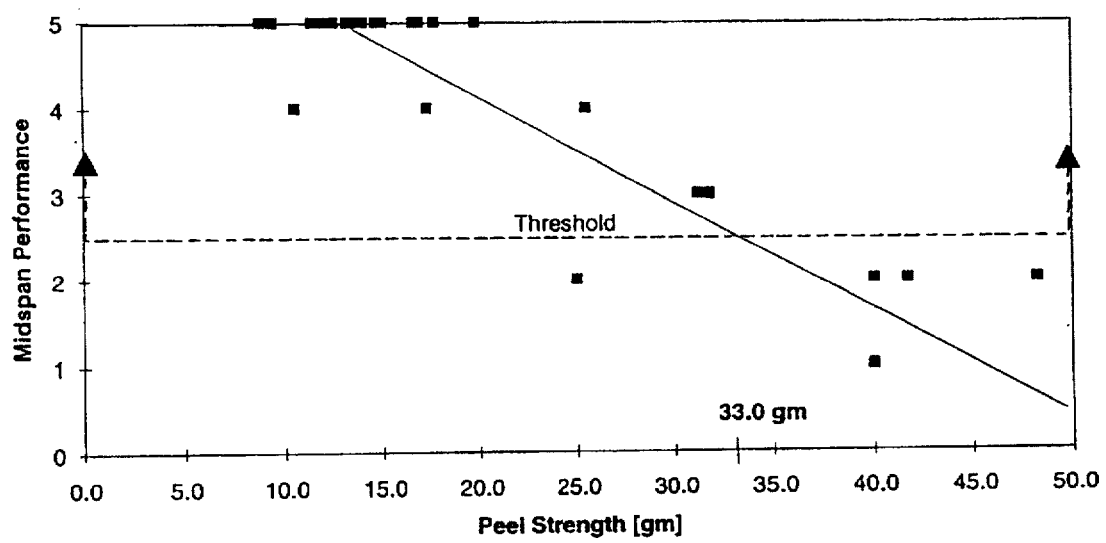
FIG. 10 is a graph of midspan entry performance of an optical ribbon fiber vs. peel strength.
Figure 11:
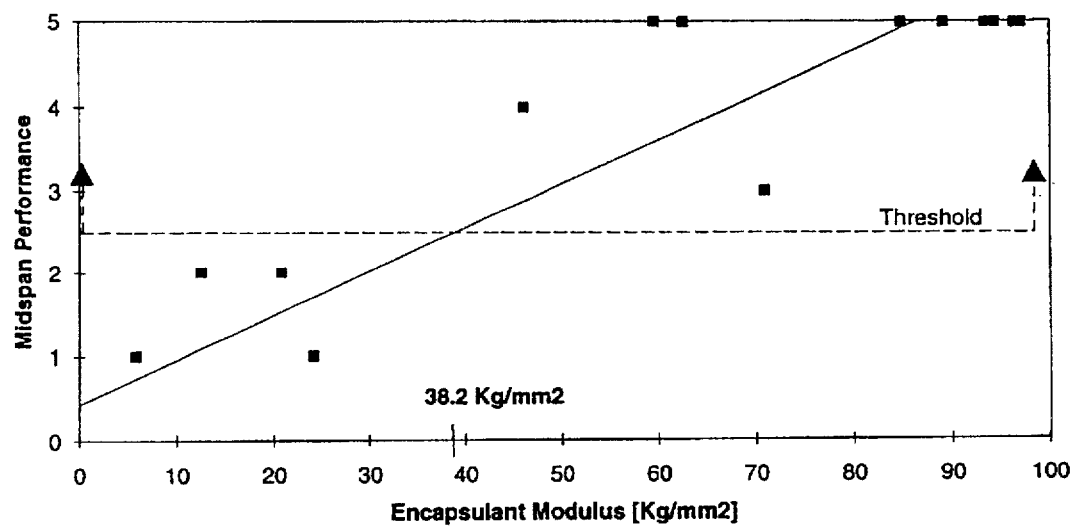
FIG. 11 is a graph of midspan entry performance of an optical ribbon fiber vs. encapsulant matrix modulus.

Referring to FIG. 10 and FIG. 11, the method described hereinabove has been determined by applicants to have particular efficacy when used on optical ribbon fibers designed to have certain defined values for peel strength and encapsulant matrix modulus. Although the novel method will work to some degree on optical ribbon fibers possessing peel strength and encapsulant matrix modulus values outside of the pertinent ranges discovered by applicants, use of optical ribbon fiber designed to possess peel strength and encapsulant matrix modulus within the ranges discovered by applicants ensures proper performance of the novel procedure for midspan entry.

More specifically, applicants have discovered that two (2) properties of an optical ribbon fiber structure are particularly significant in ensuring the proper performance of the midspan entry method described hereinabove. These properties are (1) the "peel strength" or force required to peel one side of the encapsulant away from the plurality of optical fibers and (2) the "encapsulant matrix modulus" or the sheer strength of the layer of encapsulant matrix material.

It has been discovered that the peel strength must be less than the encapsulant matrix modulus for the encapsulant to be properly peeled from the optical ribbon fiber. However, the peel strength must be great enough to prevent unwanted or uncontrolled encapsulant matrix peeling due to normal handling of the optical ribbon fiber in the field. Thus, peel strength must be sufficient to resist peeling due to bending, twisting and temperature aging stresses which are encountered in typical applications of the optical ribbon fiber.

Applicants have further discovered that the encapsulant matrix modulus must be higher than the peel strength of an optical ribbon fiber but at the same time the encapsulant matrix modulus must be less than the strength of the bond created between the encapsulant and plastic card 12 when optical ribbon fiber F is secured to card 12 by glue 14 as described in the method hereinabove. The encapsulant matrix modulus must also be low enough for it to be easily torn or cut when peeling is completed in accordance with the inventive method.

As can be seen with reference to the testing results set forth in FIGS. 10–11, applicants have unexpectedly discovered that an optical ribbon fiber having a peel strength in the range of 5.0 to 33.0 gm and an encapsulant matrix modulus equal to or greater than 38.2 Kg/mm$^2$ will ensure proper functionality of the midspan access procedure of the instant invention. Preferably, the peel strength is in the range of 8.0 to 25.0 gm and the encapsulant matrix modulus equal to or greater than 50.0 Kg/mm$^2$ for optimal functionality of the midspan access procedure. Optical ribbon fiber having the peel strength and encapsulant strength properties described herein can be incorporated into many cable constructions including single central tube, stranded loose tube and slotted core cables.

Applicants further note that the peel force values indicated above are for the primary peel or peel of a ribbon on the first side. This peel force value includes the bond between the encapsulant matrix and fibers and also the shear or tear force of the encapsulant matrix material on the edges of the optical ribbon fiber. The first peel force will be higher than the second peel force on the flip side of the ribbon. A typical peel strength range for the second peel is 3.0 to 22.0 gm with a preferred range of 4.0 to 18.0 gm.

Although other methods could be used, applicants prefer to measure peel strength in the following manner using an INSTRON tensile test bench. Attached to the base grip is a flat plate with double-sided adhesive tape placed lengthwise along the plate. The plate is positioned horizontally with the flat side facing upward. Next, a peel of the optical ribbon fiber is initiated by suitable means, and the optical ribbon fiber then affixed to the adhesive tape. The partially delaminated fibers are then lifted and affixed into the upper INSTRON clamp. Crosshead movement and ribbon peel are initiated and force versus distance is measured along the length of the tape. The point at which peel direction is 90° (straight up) is marked or calculated and a linear line is fit to the data accumulated over the entire pull. The 90° peel force from the linear fit is recorded, and conventional ASTM rules for sampling and curve fitting are then followed. Encapsulant matrix modulus is best measured by following ASTM 882–83 and specifying the secant modulus at 2.5% elongation.

Summarily, applicants have discovered a highly desirable new method for midspan entry of optical ribbon fiber as well as the necessary peel strength and encapsulant matrix modulus properties required of an optical ribbon fiber for ensuring the proper peel performance of the optical ribbon fiber in accordance with the novel method for midspan entry.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method of removing the encapsulant matrix from a selected span of optical ribbon fiber to provide access to one or more selected optical fibers within said optical ribbon fiber, said method comprising the steps of:

(a) securing a strip of adhesive tape to a support surface;

(b) adhesively securing the span length of the optical ribbon fiber to said strip of tape so as to overlay said strip of tape;

(c) lifting the span length of the optical ribbon fiber at a selected location adjacent an end of said strip of tape so as to initiate delamination of the encapsulant matrix from the optical fibers; and (d) propagating the delamination of the encapsulant matrix from the optical fibers along at least a portion of the remaining span length of the optical ribbon fiber by further lifting the span length of the optical ribbon fiber which overlays said strip of tape.

2. The method of claim 1 wherein the exposed top surface of said strip of tape has adhesive thereon.

3. The method of claim 2 wherein a substantially rigid card element is positioned over one end of said strip of tape and beneath the optical ribbon fiber.

* * * * *